United States Patent
Emura et al.

(10) Patent No.: US 10,407,128 B2
(45) Date of Patent: Sep. 10, 2019

(54) BICYCLE DERAILLEUR

(71) Applicant: Shimano Inc., Sakai, Osaka (JP)

(72) Inventors: Atsuhiro Emura, Sakai (JP); Kenkichi Inoue, Sakai (JP); Kohei Obuchi, Sakai (JP)

(73) Assignee: SHIMANO INC., Osaka (JP)

( * ) Notice: Subject to any disclaimer, the term of this patent is extended or adjusted under 35 U.S.C. 154(b) by 38 days.

(21) Appl. No.: 15/281,067

(22) Filed: Sep. 30, 2016

(65) Prior Publication Data
US 2018/0093739 A1      Apr. 5, 2018

(51) Int. Cl.
*B62M 9/1342*      (2010.01)

(52) U.S. Cl.
CPC .................. *B62M 9/1342* (2013.01)

(58) Field of Classification Search
CPC .... B62M 9/1342; B62M 9/136; B62M 9/135; B62M 9/137; B62M 9/1348
USPC ....................................... 474/80, 82
See application file for complete search history.

(56) References Cited

U.S. PATENT DOCUMENTS

| | | | | |
|---|---|---|---|---|
| 4,078,444 A * | 3/1978 | Huret | ..................... | B62M 9/136 474/140 |
| 4,279,605 A * | 7/1981 | Egami | ..................... | B62M 9/135 474/82 |
| 4,424,048 A * | 1/1984 | Shimano | ................. | B62M 9/137 474/82 |
| 4,516,961 A * | 5/1985 | Coue | ..................... | B62M 9/136 474/80 |
| 4,543,078 A * | 9/1985 | Coue | ..................... | B62M 9/1342 474/82 |
| 4,586,913 A * | 5/1986 | Nagano | ................. | B62M 9/136 474/80 |
| 4,604,078 A * | 8/1986 | Nagano | ................. | B62M 9/136 474/80 |
| 5,037,355 A * | 8/1991 | Kobayashi | ........... | B62M 9/1342 474/82 |
| 5,846,148 A * | 12/1998 | Fujii | .................... | B62M 9/1344 474/80 |
| 6,099,425 A * | 8/2000 | Kondo | .................. | B62M 9/137 474/127 |
| 6,234,927 B1 * | 5/2001 | Peng | .................... | B62M 9/1342 474/80 |
| 6,491,597 B2 * | 12/2002 | Chen | .................... | B62M 9/1342 474/80 |

(Continued)

FOREIGN PATENT DOCUMENTS

CN      101016075 A      8/2007

*Primary Examiner* — Henry Y Liu (57) ABSTRACT

A bicycle front derailleur includes a base member to be mounted to a bicycle frame, a chain guide, a first link pivotally connected to the chain guide about a first pivot axis, and a second link pivotally connected to the chain guide about a second pivot axis. The chain guide includes a link-connecting structure pivotally connected to the first link. The link-connecting structure includes a first link-connecting portion and a second link-connecting portion. The first link includes a first chain guide-connecting portion and a second chain guide-connecting portion. At least one of the first link-connecting portion and the second link-connecting portion is located between the first chain guide-connecting portion and the second chain guide-connecting portion.

16 Claims, 8 Drawing Sheets

(56) References Cited

U.S. PATENT DOCUMENTS

| | | | | |
|---|---|---|---|---|
| 6,629,903 B1* | 10/2003 | Kondo | ................ | B62M 9/1346 474/80 |
| 6,679,797 B2* | 1/2004 | Valle | .................... | B62M 9/132 474/78 |
| 7,081,058 B2* | 7/2006 | Nankou | ............... | B62M 9/1342 474/80 |
| 7,722,486 B2* | 5/2010 | Nanko | .................. | B62M 9/136 474/103 |
| 7,914,407 B2* | 3/2011 | Fukushima | .......... | B62M 9/1344 474/80 |
| 8,337,343 B2* | 12/2012 | Lin | .......................... | F16H 7/22 474/78 |
| 8,439,779 B2* | 5/2013 | Florczyk | ................ | B62M 9/135 474/80 |
| 8,777,788 B2* | 7/2014 | Kawakami | ........... | B62M 9/1344 474/80 |
| 9,156,524 B2* | 10/2015 | Emura | ................. | B62M 9/1242 |
| 9,156,525 B2* | 10/2015 | Emura | .................. | B62M 9/135 |
| 9,248,885 B2* | 2/2016 | Emura | .................. | B62M 9/1242 |
| 9,334,018 B2* | 5/2016 | Emura | .................. | B62M 9/1342 |
| 9,457,871 B2* | 10/2016 | Kuwayama | ............ | B62M 9/137 |
| 9,469,378 B2* | 10/2016 | Kuwayama | .......... | B62M 9/1342 |
| 9,499,232 B2* | 11/2016 | Emura | .................. | B62M 9/135 |
| 9,616,970 B2* | 4/2017 | Kuwayama | .......... | B62M 9/1344 |
| 2003/0083161 A1* | 5/2003 | Ozaki | ................. | B62M 9/1342 474/80 |
| 2003/0100393 A1* | 5/2003 | Nanko | ................. | B62M 9/1342 474/80 |
| 2006/0058133 A1* | 3/2006 | Tetsuka | ................ | B62M 9/1342 474/80 |
| 2007/0184925 A1 | 8/2007 | Ichida et al. | | |
| 2007/0298920 A1* | 12/2007 | Nakai | .................. | B62M 9/1342 474/80 |
| 2008/0182689 A1* | 7/2008 | Fujii | ..................... | B62M 9/136 474/82 |
| 2009/0111625 A1* | 4/2009 | Valle | .................... | B62M 9/1342 474/80 |
| 2011/0224037 A1* | 9/2011 | Auer | ..................... | B62M 9/137 474/82 |
| 2014/0243126 A1* | 8/2014 | Kuwayama | ............ | B62M 9/132 474/80 |
| 2014/0349793 A1* | 11/2014 | Emura | .................. | B62M 9/134 474/80 |
| 2014/0349794 A1* | 11/2014 | Emura | .................. | B62M 9/131 474/82 |
| 2015/0018145 A1* | 1/2015 | Emura | ................. | B62M 9/1342 474/80 |
| 2015/0018146 A1* | 1/2015 | Emura | ................. | B62M 9/1342 474/80 |
| 2015/0094177 A1* | 4/2015 | Emura | ................. | B62M 9/1242 474/80 |
| 2015/0094178 A1* | 4/2015 | Emura | ................. | B62M 9/1242 474/80 |
| 2016/0023714 A1* | 1/2016 | Emura | ................. | B62M 9/1342 474/122 |
| 2016/0075401 A1* | 3/2016 | Kuwayama | .......... | B62M 9/1342 474/80 |
| 2017/0036736 A1* | 2/2017 | Duweling | ............ | B62M 9/1342 |
| 2017/0240246 A1* | 8/2017 | Emura | .................. | B62M 9/136 |
| 2017/0283005 A1* | 10/2017 | Inoue | ................... | B62M 9/105 |

* cited by examiner

BICYCLE DERAILLEUR

FIELD OF THE INVENTION

The invention generally relates to bicycles, and more particularly to front derailleurs for bicycles.

BACKGROUND OF THE INVENTION

Bicycle manufacturers are continually improving bicycle frames and changing their configurations. Bicycle components must be continually improved to be compatible with a wide variety of bicycle frames. A bicycle derailleur that is more compact is likely to fit more bicycle frames and is less likely to cause interference with other parts.

SUMMARY OF THE INVENTION

In a first aspect of the invention, a bicycle front derailleur includes a base member configured to be mounted to a bicycle frame, a chain guide, a first link pivotally connected to the chain guide about a first pivot axis, and a second link pivotally connected to the chain guide about a second pivot axis. The chain guide includes a link-connecting structure pivotally connected to the first link. The link-connecting structure includes a first link-connecting portion and a second link-connecting portion. The first link includes a chain guide-connecting structure pivotally connected to the link-connecting structure of the chain guide. The chain guide-connecting structure includes a first chain guide-connecting portion and a second chain guide-connecting portion. At least one of the first link-connecting portion and the second link-connecting portion is located between the first chain guide-connecting portion and the second chain guide-connecting portion.

With the bicycle front derailleur according to the first aspect, it is possible to make the front derailleur compact.

In a second aspect of the invention, in the bicycle front derailleur according to the first aspect, the first link includes a cable-actuation portion to transmit a pulling force of a bicycle-control cable to the first link.

With the bicycle front derailleur according to the second aspect, it is possible to make the front derailleur compact.

In a third aspect of the invention, in the bicycle front derailleur according to the second aspect, the first chain guide-connecting portion is located between the cable-actuation portion and the first link-connecting portion as viewed in a transverse direction of the chain guide, which is perpendicular to the first pivot axis.

With the bicycle front derailleur according to the third aspect, it is possible to make the front derailleur compact.

In a fourth aspect of the invention, in the bicycle front derailleur according to the third aspect, the first chain guide-connecting portion partly overlaps with the cable-actuation portion as viewed from the transverse direction.

With the bicycle front derailleur according to the fourth aspect, it is possible to make the front derailleur compact.

In a fifth aspect of the invention, in the bicycle front derailleur according to any one of the first to fourth aspects, the second chain guide-connecting portion is located between the first link-connecting portion and the second link-connecting portion.

With the bicycle front derailleur according to the fifth aspect, it is possible to make the front derailleur compact.

In a sixth aspect of the invention, in the bicycle front derailleur according to any one of the first to fifth aspects further includes a biasing member located between the first link-connecting portion and the second chain guide-connecting portion.

With the bicycle front derailleur according to the sixth aspect, it is possible to reduce frictional resistance between the biasing member and each of the first link-connecting portion and the second chain guide-connecting portion.

In a seventh aspect of the invention, in the bicycle front derailleur according to the sixth aspect, the biasing member includes a first end and a second end opposite to the first end in an axial direction of the first pivot axis. The first end of the biasing member is located in a vicinity of the first link-connecting portion to transmit a biasing force to the chain guide. The second end of the biasing member is located in a vicinity of the second chain guide-connecting portion to transmit a biasing force to the first link.

With the bicycle front derailleur according to the seventh aspect, it is possible to reduce frictional resistance between the biasing member and each of the first link-connecting portion and the second chain guide-connecting portion, since this can reduce relative movement between the first end of the biasing member and the chain guide and also reduce the relative movement between the second end of the biasing member and the first link.

In an eighth aspect of the invention, in the bicycle front derailleur according to any one of the first to seventh aspects, both of the first link-connecting portion and the second link-connecting portion are located between the first chain guide-connecting portion and the second chain guide-connecting portion.

With the bicycle front derailleur according to the eighth aspect, it is possible to make the front derailleur compact.

In a ninth aspect of the invention, in the bicycle front derailleur according to any one of the first to eighth aspects, the first link is located closer to the bicycle frame than the second link in a state where the base member is mounted to the bicycle frame. The chain guide includes a first chain guide plate and a second chain guide plate, and the first chain guide plate and the second chain guide plate define a chain receiving space therebetween.

With the bicycle front derailleur according to the ninth aspect, it is possible to make the inner link of the front derailleur compact.

In a tenth aspect of the invention, in the bicycle front derailleur according to the ninth aspect, the first link-connecting portion and the second link-connecting portion protrude from the first chain guide plate toward the bicycle frame.

With the bicycle front derailleur according to the tenth aspect, it is possible to make the inner guide plate of the chain guide of the front derailleur compact.

In an eleventh aspect of the invention, in the bicycle front derailleur according to the tenth aspect, the first chain guide plate is located closer to the bicycle frame than the second chain guide plate in a state where the base member is mounted to the bicycle frame.

With the bicycle front derailleur according to the eleventh aspect, it is possible to make the inner guide plate of the chain guide of the front derailleur compact.

In a twelfth aspect of the invention, in the bicycle front derailleur according to any one of the first to eleventh aspects further includes a pivot pin coaxially-arranged with the first pivot axis, wherein the pivot pin is configured to be coupled to the first chain guide-connecting portion and the second chain guide-connecting portion in a press-fit manner, respectively.

With the bicycle front derailleur according to the twelfth aspect, it is possible to reduce the number of parts of the front derailleur.

In a thirteenth aspect of the invention, in the bicycle front derailleur according to the twelfth aspect, the first link-connecting portion and the second link-connecting portion are rotationally coupled to the pivot pin.

With the bicycle front derailleur according to the thirteenth aspect, it is possible to reduce the number of parts of the front derailleur.

In a fourteenth aspect of the invention, in the bicycle front derailleur according to any one of the first to thirteenth aspects, the chain guide is configured to move between a retracted position and an extended position with respect to the base member, and the first link is configured such that the first pivot axis moves in a forward-rearward direction when the chain guide moves between the retracted position and the extended position.

With the bicycle front derailleur according to the fourteenth aspect, it is possible to make a side-swing-type front derailleur compact.

In a fifteenth aspect of the invention, in the bicycle front derailleur according to any one of the first to fourteenth aspects, the first link-connecting portion and the first chain guide-connecting portion are located above the second link-connecting portion and the second chain guide-connecting portion in a state where the base member is mounted to the bicycle frame.

With the bicycle front derailleur according to the fifteenth aspect, it is possible to make a vertical dimension of the front derailleur small.

In a sixteenth aspect of the invention, in the bicycle front derailleur according to the fifteenth aspect, the first link-connecting portion is located between the first chain guide-connecting portion and the second chain guide-connecting portion.

With the bicycle front derailleur according to the sixteenth aspect, it is possible to make a vertical dimension of the front derailleur small.

In a seventeenth aspect of the invention, the bicycle front derailleur according to any one of the second, third, and fourth aspects of the invention, the cable-actuation portion includes a cable attachment portion to which a bicycle-control cable is fixed.

With the bicycle front derailleur according to the seventeenth aspect, it is possible to make the front derailleur compact.

In an eighteenth aspect of the invention, a bicycle front derailleur includes a base member configured to be mounted to a bicycle frame, a chain guide configured to move between a retracted position and an extended position with respect to the base member, an adjustment structure configured to adjust at least one of the retracted position and the extended position. The adjustment structure includes at least one adjustment member and a looseness-suppression member configured to suppress looseness of the at least one adjustment member. The looseness-suppression member has an outer periphery, and the outer periphery has at least one recessed portion configured to receive the at least one adjustment member in a state where the least one recessed portion of the looseness-suppression member receives the at least one adjustment member.

With the bicycle front derailleur according to the eighteenth aspect, it is possible to reduce the receiving space of a looseness-suppression member.

Other advantages and features of the present invention will become apparent to those skilled in the art from the following detailed description and the drawings.

DESCRIPTION OF THE EMBODIMENTS

Selected embodiments of the present invention will now be described with reference to the accompanying drawings. It will be apparent to those skilled in the art from this disclosure that the following description of the invention is provided for illustration only and not for the purpose of limiting the invention as defined by the appended claims and their equivalents.

Figure 1:
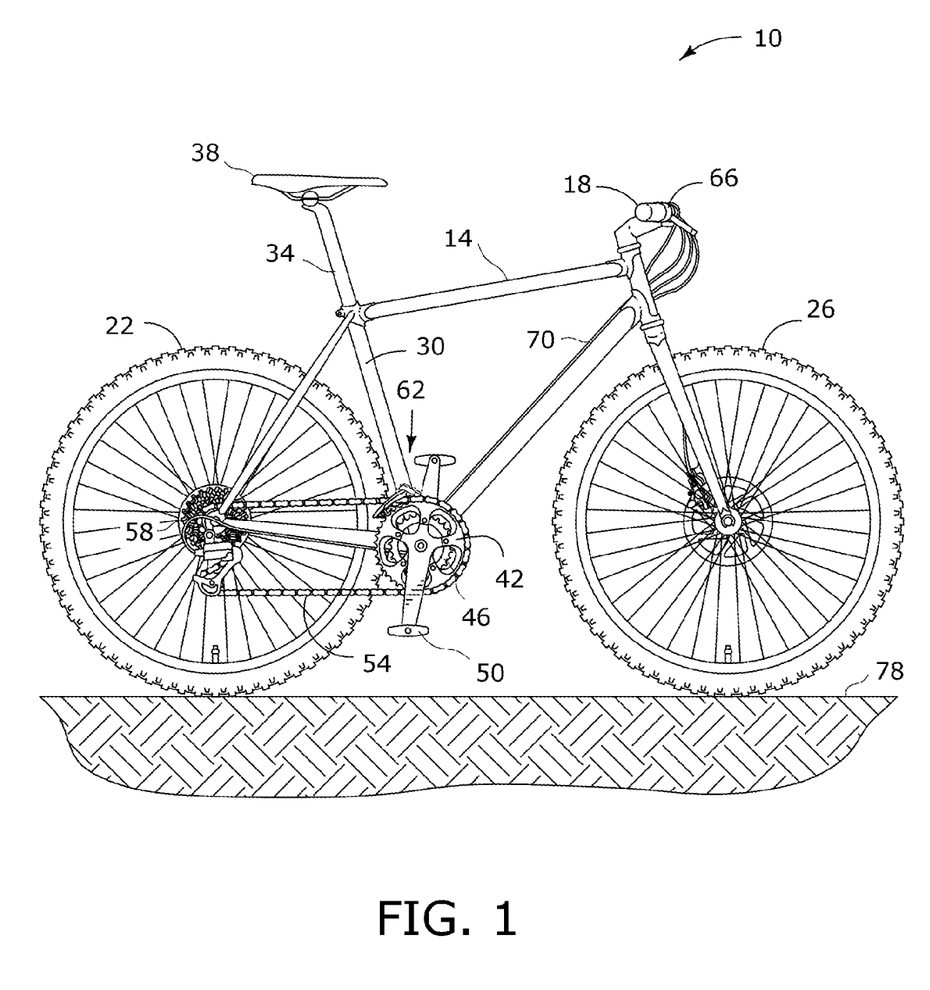
FIG. 1 is a right side elevation view of a bicycle on which the front derailleur of the present invention is mounted.

Referring initially to FIG. 1, an exemplary bicycle 10 according to at least one disclosed embodiment of the present invention is shown. The bicycle 10 includes a bicycle frame 14. A handlebar 18, a rear wheel 22 and a front wheel 26 are attached to the bicycle frame 14 in a conventional manner. The bicycle frame 14 includes a seat tube 30, to which a seatpost 34 and a saddle 38 are attached. The bicycle 10 further includes a large front sprocket 42, a small front sprocket 46, and pedals 50 for driving the front sprockets 42, 46. A chain 54 extends between one of the front sprockets 42, 46 and a rear sprocket assembly 58. A front derailleur 62 is fixed to the bicycle frame 14 for shifting the chain 54 between the front sprockets 42, 46. An operating device 66 can be located on the handlebar 18 for operating the front derailleur 62. A bicycle-control cable 70 can extend between the operating device 66 and the front derailleur 62. Except for the front derailleur 62, the bicycle 10 is conventional, and the bicycle 10 is not described in detail except to the extent necessary to describe the operation and surroundings of the front derailleur 62.

Figure 6:
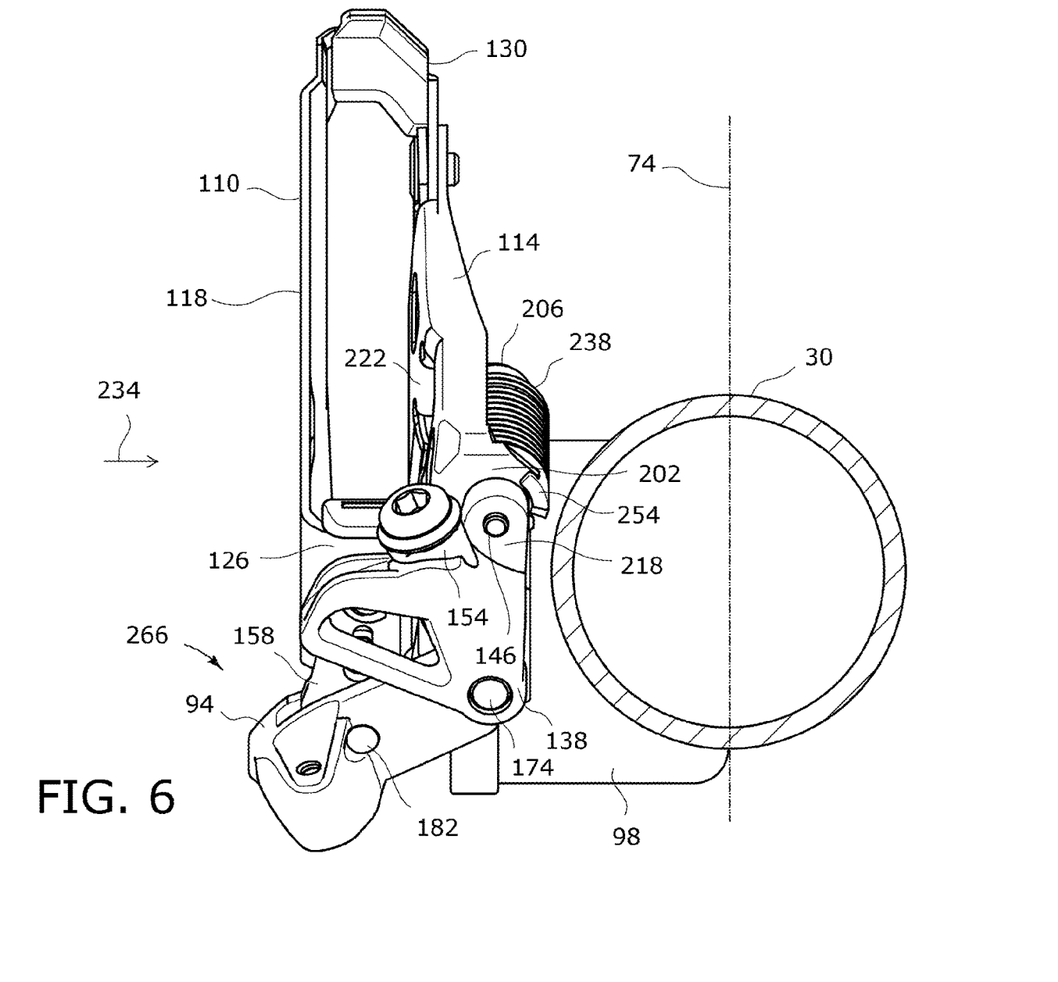
FIG. 6 is a top view of the front derailleur of FIG. 2.
Figure 10:
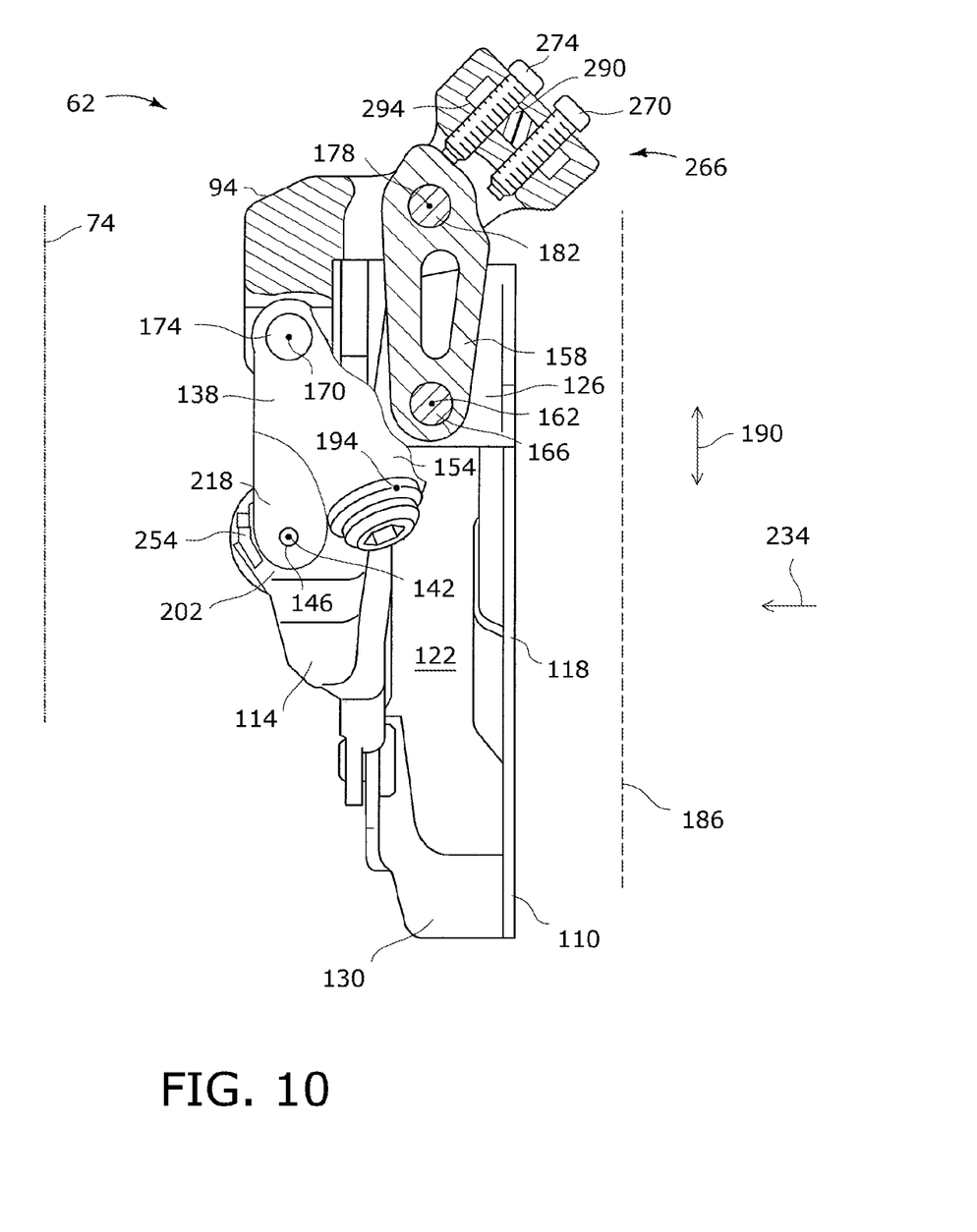
FIG. 10 is a cross sectional view taken along the plane 10-10 of FIG. 2.

For reference purposes, a vertical center plane 74 passes through the center of the bicycle frame 14, as shown in FIGS. 6 and 10. The vertical center plane 74 is perpendicular to a rotational center axis of the front sprockets 42, 46 and is perpendicular to the road surface 78 shown in FIG. 1. The vertical center plane 74 bisects the bicycle frame 14 in a direction parallel to the rotational center axis. Thus, the bicycle 10 shown in FIG. 1 is in an upright position. In the present application, the following directional terms "forward", "rearward", "left", "right", "upward" and "downward" and any other similar directional terms refer to directions that are determined with respect to a rider who sits on the saddle 38 facing the handlebar 18 when the bicycle 10 is in the upright position of FIG. 1.

In the illustrated embodiment, the front derailleur 62 is fixed to the seat tube 30 with a bracket 98, as shown in FIG. 6. However, the front derailleur 62 can be fixed to another frame member or to a different bracket that is fixed to another location of the seat tube 30 or another frame member. The bicycle front derailleur 62 can be fitted to bicycle frames of various styles, shapes, and sizes.

Referring to FIGS. 6 and 10, the bicycle front derailleur 62 includes a base member 94 configured to be mounted to the bicycle frame 14. The base member 94 is made of rigid material such as metal material or a fiber reinforced material. FIG. 6 shows the bracket 98 for fixing the base member 94 to the seat tube 30; however, the base member 94 can be attached to the bicycle frame 14 with a variety of different brackets or clamps. As shown in FIG. 3, elongated fastening openings 102 can be formed in the base member 94 to permit vertical adjustment of the front derailleur 62 in accordance with different front sprocket sizes. As shown in the embodiment of FIG. 2, bolts 106 can pass through the fastening openings 102 and engage threads in the bracket 98 to secure the base member 94 to the bicycle frame 14.

Figure 2:
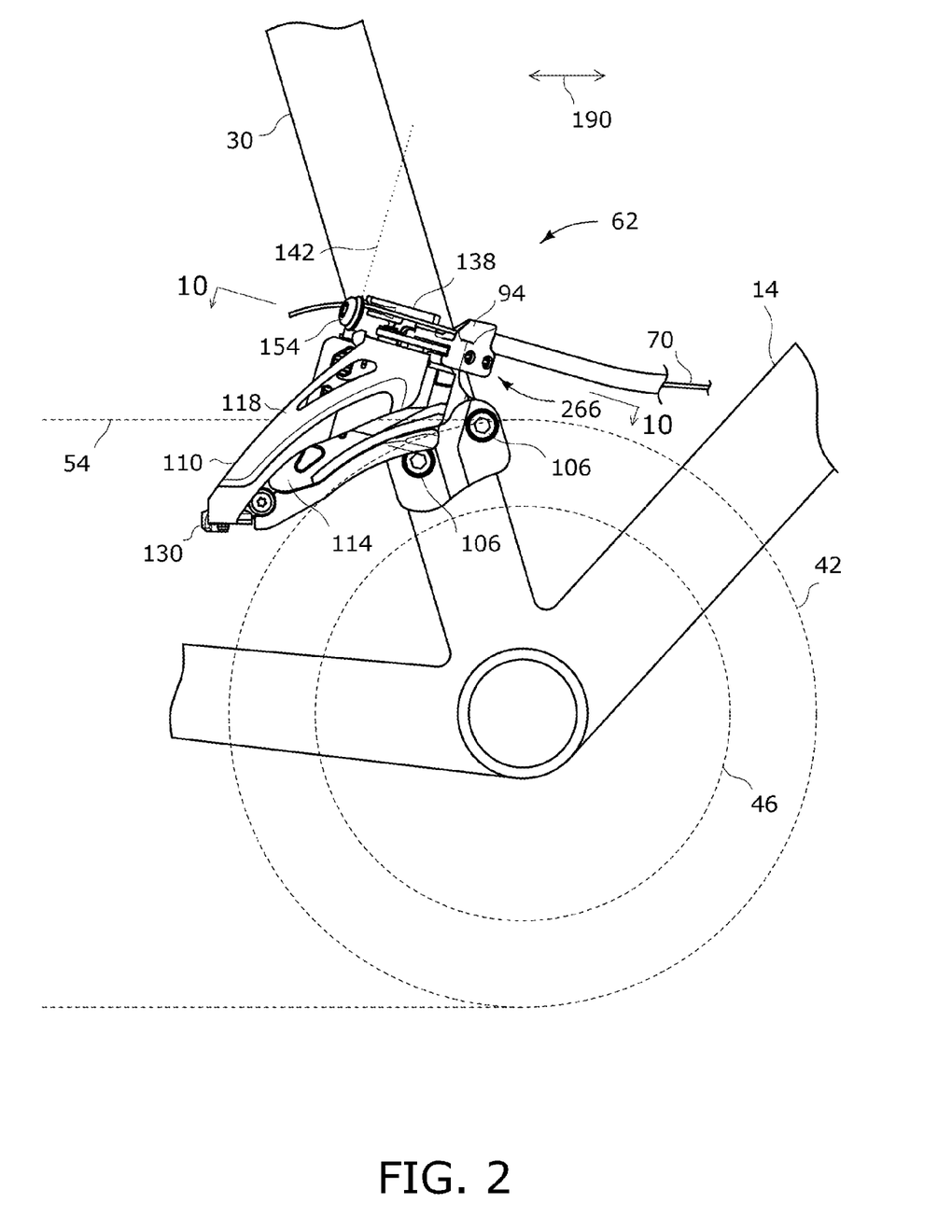
FIG. 2 is a partial, right side elevation view of the bicycle showing the front derailleur.
Figure 3:
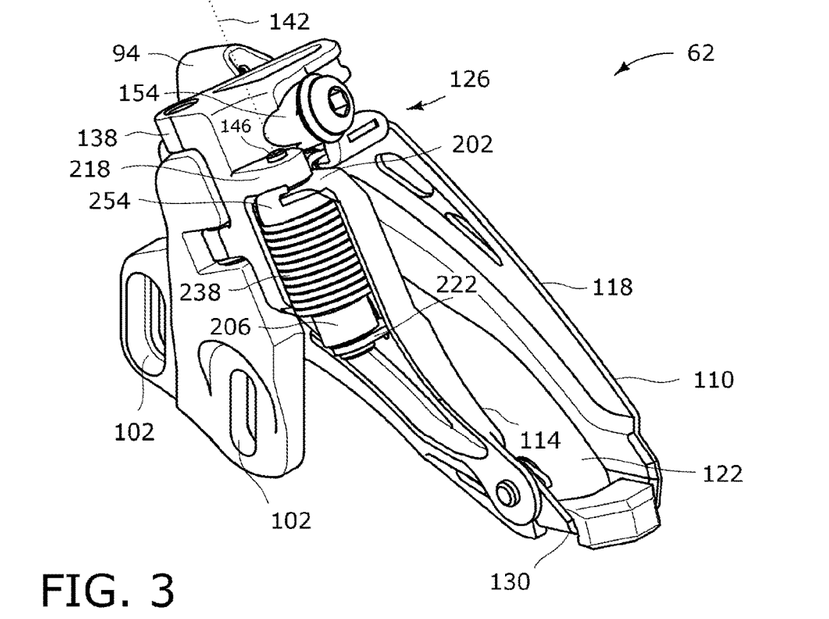
FIG. 3 is a perspective view showing the front derailleur of FIG. 2.

Referring to FIG. 2, the front derailleur 62 further includes a chain guide 110. The chain guide 110 is preferably made of a rigid material such as metal, a resin material, or a fiber-reinforced material. The chain guide 110 includes a first chain guide plate 114 and a second chain guide plate 118, and the first chain guide plate 114 and the second chain guide plate 118 define a chain-receiving space 122 therebetween. Referring to FIG. 6, the first chain guide plate 114 is located closer to the bicycle frame 14 than the second chain guide plate 118 in a state where the base member 94 is mounted to the bicycle frame 14. As shown in FIGS. 1 and 2, the chain 54 occupies the chain-receiving space 122 when the front derailleur 62 is installed on the bicycle 10. In the illustrated embodiment, with reference to FIG. 4, an upper connecting member 126 extends between the first chain guide plate 114 and the second chain guide plate 118 at the upper end of the chain guide 110. A lower connecting member 130 extends between the first chain guide plate 114 and the second chain guide plate 118 at the lower end of the chain guide 110.

Referring to FIGS. 2 and 6, the front derailleur 62 further includes a first link 138 pivotally connected to the chain guide 110 about a first pivot axis 142. The first pivot axis 142 is defined by a pivot pin 146, which is a first pin, formed between the first link 138 and the chain guide 110. That is, the pivot pin 146 is coaxially arranged with the first pivot axis 142. As shown in FIGS. 2 and 6, the first link 138 includes a cable-attachment portion 154, as a cable-actuation portion, to which the bicycle-control cable 70 is fixed. The cable-actuation portion 154 is configured to transmit a pulling force of a bicycle-control cable to the first link 138. Alternatively, the cable-attachment portion can be disposed on the base member 94. In such a configuration, the first link 138 can include a cable actuation-portion to engage with the bicycle-control cable 70 an end of which is fixed to the base member 94 via the cable-attachment portion. The cable actuation-portion can include a cable guiding portion to guide the bicycle-control cable 70 in a pulling direction of the bicycle-control cable 70.

Figure 4:
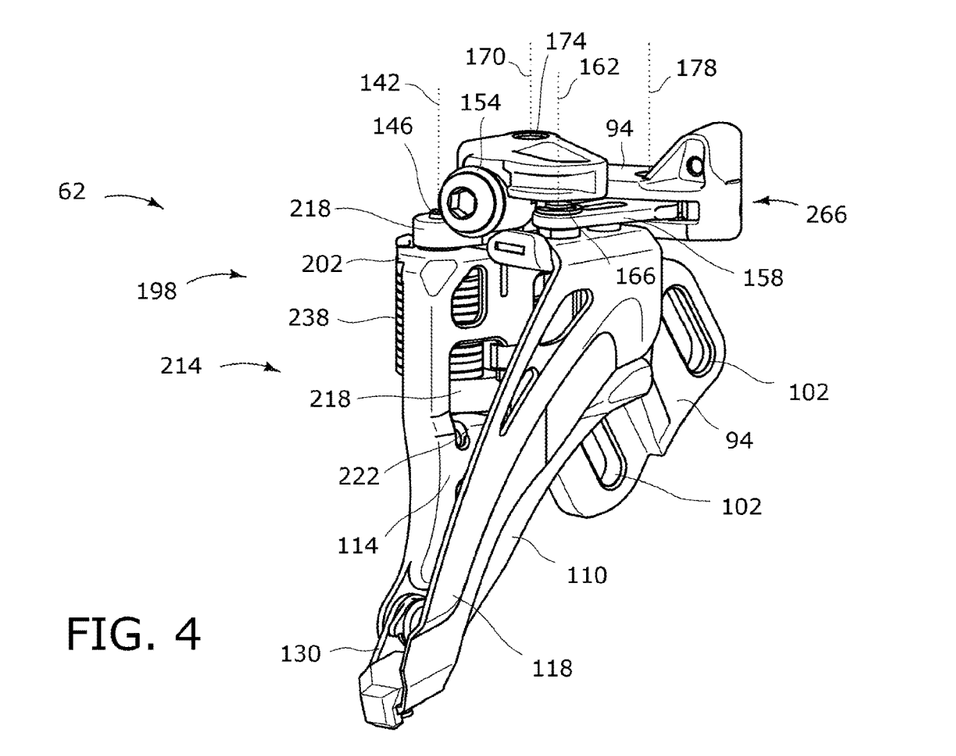
FIG. 4 is another perspective view showing the front derailleur of FIG. 2.
Figure 5:
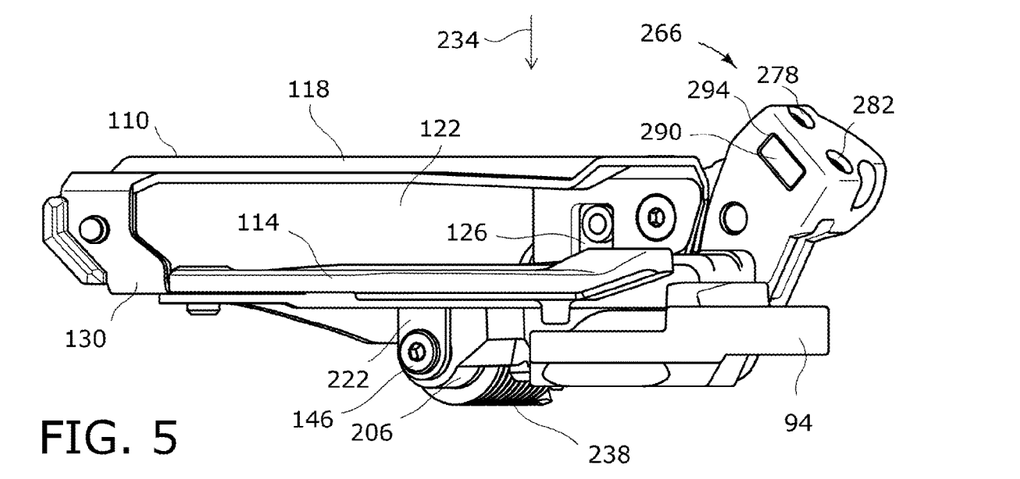
FIG. 5 is a bottom view of the front derailleur of FIG. 2.

Referring to FIGS. 4 and 6, the front derailleur 62 further includes a second link 158 pivotally connected to the chain guide 110 about a second pivot axis 162. The second pivot axis 162 is defined by a second pin 166 formed between the second link 158 and the chain guide 110.

As best seen in FIG. 4, the first link 138 is also pivotally connected to the base member 94 about a third pivot axis 170. As best shown in FIGS. 3 and 10, the third pivot axis 170 is defined by a third pin 174 formed between the base member 94 and the first link 138. As best seen in FIGS. 4 and 6, the second link 158 is also pivotally connected to the base member 94 about a fourth pivot axis 178. The fourth pivot axis 178 is defined by a fourth pin 182 formed between the second link 158 and the base member 94. Referring to FIG. 6, the first link 138 is located closer to the bicycle frame 14 than the second link 158 in a state where the base member 94 is mounted to the bicycle frame 14. As shown best in FIGS. 4 and 10, the first link 138, the second link 158, the base member 94 and the chain guide 110 form a four-bar link mechanism. The first, second, third and fourth pivot axes extend in a direction substantially parallel to a vertical direction in a state where the bicycle front derailleur 62 is mounted to the bicycle frame 14. Alternatively, the first, second, third and fourth pivot axes are inclined with respect to a longitudinal direction of the seat tube 30 within a range of 30 degrees in the state where the bicycle front derailleur 62 is mounted to the bicycle frame 14. The first link 138 extends between the first pivot axis 142 and the third pivot axis 170. The second link 158 extends between the second pivot axis 162 and the fourth pivot axis 178. A portion of the chain guide 110 defines a third link between the first pivot axis 142 and the second pivot axis 162. A portion of the base member 94 defines a fourth link between the third pivot axis 170 and the fourth pivot axis 178. Swinging movement of the first link 138 and the second link 158 causes the chain guide 110 to move laterally with respect to the base member 94 to guide the chain 54 between the front sprockets 42, 46 in a known fashion. That is, referring to FIG. 10, the chain guide 110 is configured to move between a retracted position and an extended position with respect to the base member 94. FIG. 10 shows the retracted position of the chain guide 110 in solid lines, and the extended position of the chain guide 110 is indicated by broken lines 186. The broken lines 186 indicate the outer edge of the second chain guide plate 118 when the chain guide 110 is in the extended position. The chain guide 110 is farther from the base member 94 when in the extended position as compared to the retracted position.

As shown in FIG. 10, the first link 138 is configured such that the first pivot axis 142 moves in a forward-rearward direction 190 when the chain guide 110 moves between the retracted position and the extended position. The retracted position of the first pivot axis 142 is shown by the solid lines in FIG. 10. The extended position of the first pivot axis 142 is shown by an extended-position point 194 which is forward of and outward of the retracted position of the first pivot axis 142. Thus, the first pivot axis 142 moves not only in a left-right, inward-outward, or lateral direction but a front-rear (forward-rearward) direction when moving between the retracted position and the extended position. When the bicycle-control cable 70 is pulled by the operating device 66 operated by a rider, the first pivot axis 142 swings rightward (outward) in FIG. 10, which causes the chain guide 110 to move from the retracted position to the extended position.

Figure 8:
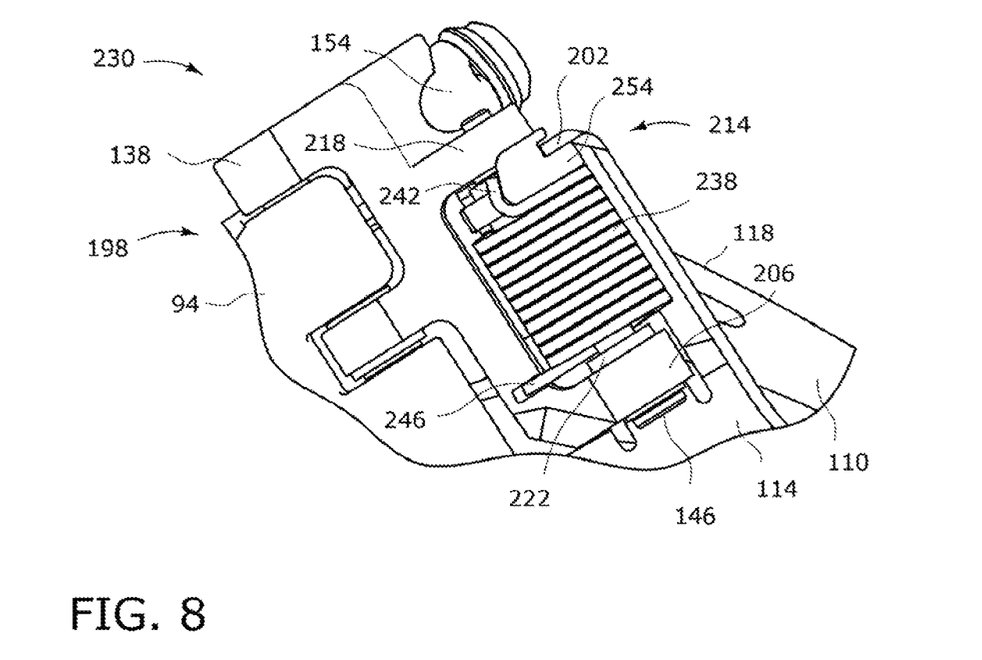
FIG. 8 is a partial left side elevation view like FIG. 7 showing an alternate embodiment of the front derailleur as viewed from a transverse direction.

As shown in FIGS. 3, 4, and 8, the chain guide 110 includes a link-connecting structure 198 pivotally connected to the first link 138. The link-connecting structure 198 includes a first link-connecting portion 202 and a second link-connecting portion 222. As best shown in FIG. 6, in the illustrated embodiment, the first link-connecting portion 202 and the second link-connecting portion 222 protrude from the first chain guide plate 114 toward the bicycle frame 14.

Figure 7:
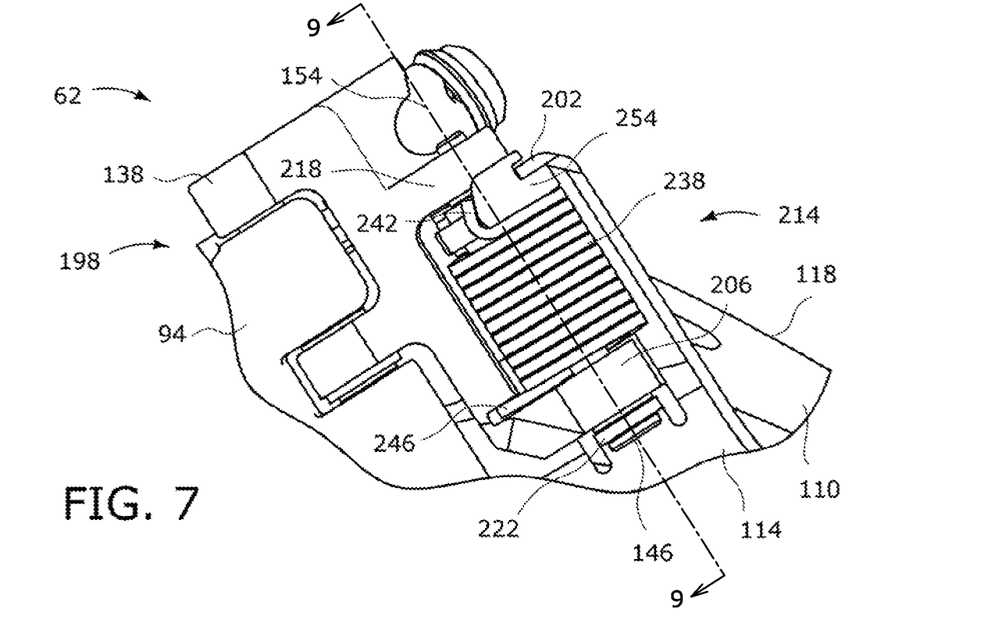
FIG. 7 is a partial left side elevation view of the front derailleur of FIG. 2 as viewed from a transverse direction.
Figure 9:
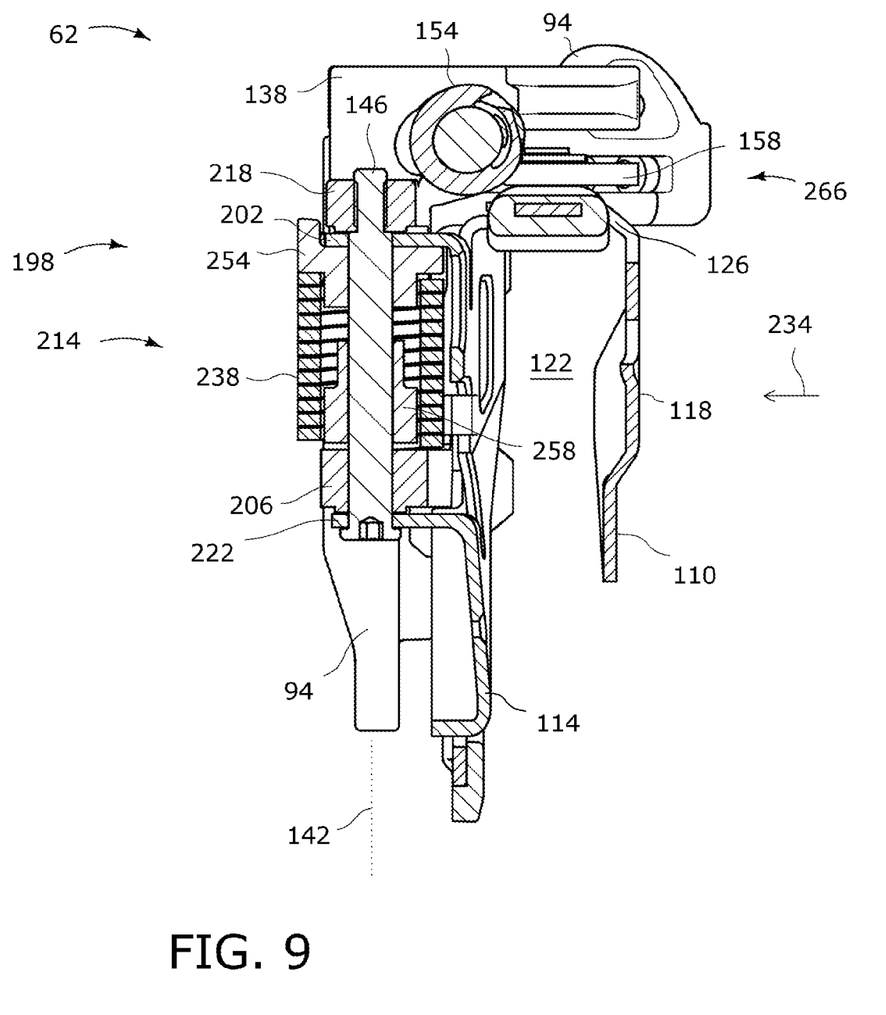
FIG. 9 is a cross sectional view taken along plane 9-9 of FIG. 7.

Further, as shown in FIGS. 3, 4 and 9, the first link 138 includes a chain guide-connecting structure 214 pivotally connected to the link-connecting structure 198 of the chain guide 110. The chain guide-connecting structure 214 includes a first chain guide-connecting portion 218 and a second chain guide-connecting portion 206. In the illustrated embodiment, as shown best in FIG. 9, the pivot pin 146 is configured to be coupled to the first chain guide-connecting portion 218 and the second chain guide-connecting portion 206 in a press-fit manner, respectively. However, other fastening structures can be used to join the pivot pin 146 to the chain guide-connecting structure 214. The pivot pin 146 can be connected to the first chain guide-connecting portion 218 and the second chain guide-connecting portion 206 via a bushing or bearing slidably connecting them with each other. As best shown in FIG. 9, the first link-connecting portion 202 and the second link-connecting portion 222 are rotationally coupled to the pivot pin 146. That is, in the illustrated embodiment, the first link-connecting portion 202 and the second link-connecting portion 222 can rotate freely about the pivot pin 146. As best shown in FIGS. 6, 7, and 9, the first link-connecting portion 202 and the first chain guide-connecting portion 218 are located above the second link-connecting portion 222 and the second chain guide-connecting portion 206 in a state where the base member 94 is mounted to the bicycle frame 14. In addition, in the illustrated embodiment and as best shown in FIGS. 6, 7, and 9, the first link-connecting portion 202 is located between the first chain guide-connecting portion 218 and the second chain guide-connecting portion 206.

As best shown in FIGS. 7 and 9, at least one of the first link-connecting portion 202 and the second link-connecting portion 222 is located between the first chain guide-connecting portion 218 and the second chain guide-connecting portion 206. In the illustrated embodiment of FIGS. 7 and 9, only the first link-connecting portion 202 is located between the first chain guide-connecting portion 218 and the second chain guide-connecting portion 206, and the second link-connecting portion 222 is located below the second chain guide-connecting portion 206; however, the embodiment of FIGS. 2-7 and 9 can be modified such that the first link-connecting portion 202 is located above the first chain guide-connecting portion 218, and the second link-connecting portion 222 is located between the first chain guide-connecting portion 218 and the second chain guide-connecting portion 206.

FIG. 8 shows another front derailleur 230 in which the second chain guide-connecting portion 206 is in a different location in comparison to that of the front derailleur 62 of the embodiment of FIG. 7. Otherwise, the front derailleur of FIG. 8 is the same as that of FIG. 7. Reference numbers that are the same as or similar to the reference numbers used in connection with the embodiment of FIGS. 2-7 may be used in the description of the embodiment of FIG. 8 to designate parts that correspond to same or similar parts in the embodiment of FIGS. 2-7. In the embodiment of FIG. 8, the second chain guide-connecting portion 206 is located below the second link-connecting portion 222. In other words, the second link-connecting portion 222 is located between the first chain guide connecting portion 218 and the second chain guide connecting portion 206. Further, in the embodiment of FIG. 8, both of the first link-connecting portion 202 and the second link-connecting portion 222 are located between the first chain guide-connecting portion 218 and the second chain guide-connecting portion 206.

Referring to FIGS. 7 and 8, the first chain guide-connecting portion 218 is located between the cable-actuation portion 154 and the first link-connecting portion 202 as viewed in a transverse direction 234 of the chain guide 110, which is perpendicular to the first pivot axis 142. As best shown in FIGS. 7 and 8, the first chain guide-connecting portion 218 partly overlaps with the cable-actuation portion 154 as viewed from the transverse direction 234. This illustrates the compactness of the front derailleur 62. Specifically, in this configuration, the front derailleur 62 can be compact in a vertical direction.

Referring to FIGS. 7 and 9, the front derailleur 62 further includes a biasing member 238 located between the first link-connecting portion 202 and the second chain guide-connecting portion 206. Although the biasing member 238 is a torsion spring in the illustrated embodiment, other types of biasing members can be employed to perform the same biasing function. In the illustrated embodiment, the biasing member 238 includes a first end 242 and a second end 246. The second end 246 is opposite to the first end 242 in an axial direction of the first pivot axis 142. The first end 242 of the biasing member 238 is located in a vicinity of the first link-connecting portion 202 to transmit a biasing force to the chain guide 110. The second end 246 of the biasing member 238 is located in a vicinity of the second chain guide-connecting portion 206 to transmit a biasing force to the first link 138. Referring to FIGS. 7 and 9, in the illustrated embodiment, an upper bushing 254 is fitted to the upper end of the biasing member 238, and a lower bushing 258 is fitted to the lower end of the biasing member 238. The first end 242 of the biasing member 238, which is the upper end in this embodiment, engages the upper bushing 254, and the upper bushing 254 engages the chain guide 110. Thus, the upper bushing 254 transmits the force of the biasing member 238 from the first end 242 of the biasing member 238 to the chain guide 110 in the vicinity of the first link-connecting portion 202. Alternatively however, the first end 242 of the biasing member 238 can engage the chain guide 110 directly without the intervening upper bushing 254. As shown in FIG. 7, the second end 246 of the biasing member 238 engages the first link 138 in the vicinity of the second chain guide-connecting portion 206 and transmits the force of the biasing member 238 to the first link 138. However, the second end 246 of the biasing member 238 is not required to engage the first link 138 directly as long as the force of the biasing member 238 is transmitted to the first link 138.

Figure 11:
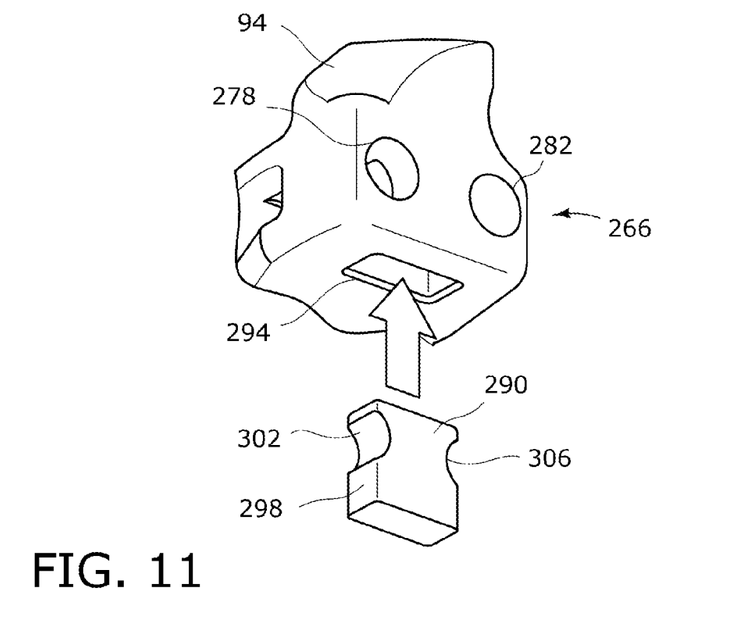
FIG. 11 is a partial perspective view of the front derailleur of FIG. 2 showing installation of a looseness-suppression member in the front derailleur.
Figure 12:
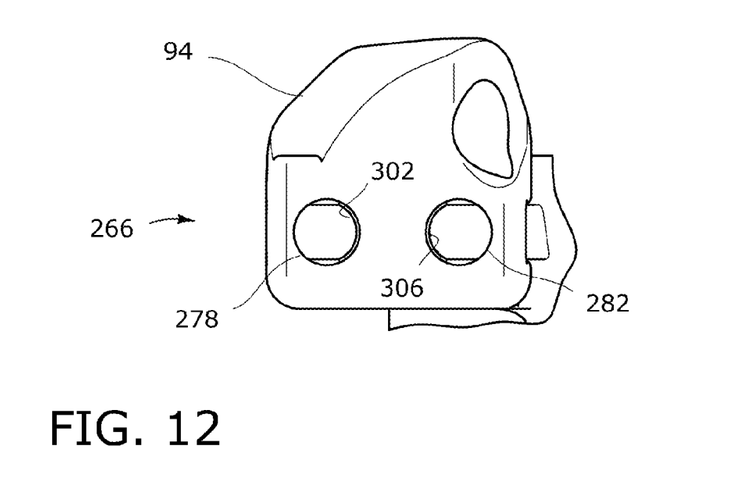
FIG. 12 is a partial view of the front derailleur of FIG. 2 as seen along the axes of a pair of openings for a pair of adjustment members.

Referring especially to FIGS. 10-12, the bicycle front derailleur 62 includes an adjustment structure 266 configured to adjust at least one of the retracted position and the extended position. The adjustment structure 266 includes at least one adjustment member 270, 274. In the illustrated embodiment of FIG. 10, first and second adjustment members 270, 274 are provided. The first adjustment member 270 is a first threaded bolt, and second adjustment member 274 is a second threaded bolt. The first threaded bolt 270 passes through a first opening 278 in the base member 94, and the second threaded bolt 274 passes through a second opening 282 in the base member 94. The first and second adjustment members 270, 274 can have threads to be threaded to through-holes in the base member 94. The end of the first adjustment member 270 forms a retraction limit stop for the second link 158 and defines the retracted position of the chain guide 110. The end of the second adjustment member 274 forms an extension limit stop for the second link 158 and defines the extended position of the chain guide 110. Rotation of the first adjustment member 270 and the second adjustment member 274 adjusts the extended and retracted positions of the chain guide 110, respectively.

The adjustment structure 266 further includes a looseness-suppression member 290 configured to suppress looseness of the at least one adjustment member 270, 274. As shown in FIG. 11, the looseness-suppression member 290 is installed through a slot 294 into the base member 94. As best shown in FIG. 11, the looseness-suppression member 290 has an outer periphery 298, and the outer periphery 298 has at least one recessed portion 302, 306 configured to receive the at least one adjustment member 270, 274 in a state where the least one recessed portion 302, 306 of the looseness-suppression member 290 receives the at least one adjustment member 270, 274. In the illustrated embodiment, the outer periphery 298 has two recessed portions 302, 306 configured to receive two adjustment members 270, 274. Preferably, the looseness suppression member 290 is made of non-metallic material such as resin or rubber. The looseness-suppression member 290 is sized and positioned to engage with only an inner part of the outer surface of each of the at least one adjustment member 270, 274 when the adjustment members 270, 274 are threaded into the base member 94. As shown in FIG. 12, the looseness-suppression member 290 extends slightly into inner regions of the paths of the adjustment members 270, 274. The engagement between the looseness-suppression member 290 and the adjustment members 270, 274 applies friction to the adjustment members, suppresses unintentional rotation of the adjustment members 270, 274, and prevents unintentional changes in the adjustment of the retracted position and the extended position of the chain guide 110.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents. For example, this invention may be applied to other types of front derailleurs such as a "down-swing" type or a "top-swing" type of front derailleur. Also, this invention may be applied to an electro-mechanical front derailleur that includes an actuation motor to actuate the four-link mechanism in response to electronic signals.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

The invention claimed is:

1. A bicycle front derailleur, comprising:
a base member configured to be mounted to a bicycle frame,
a chain guide;
a first link pivotally connected to the chain guide about a first pivot axis; and
a second link pivotally connected to the chain guide about a second pivot axis, wherein
the chain guide includes a link-connecting structure pivotally connected to the first link,
the link-connecting structure includes a first link-connecting portion and a second link-connecting portion,
the first link includes a chain guide-connecting structure pivotally connected to the link-connecting structure of the chain guide,
the chain guide-connecting structure includes a first chain guide-connecting portion and a second chain guide-connecting portion,
at least one of the first link-connecting portion and the second link-connecting portion is located between the first chain guide-connecting portion and the second chain guide-connecting portion, and
both of the first link-connecting portion and the second link-connecting portion are located between the first chain guide-connecting portion and the second chain guide-connecting portion.

2. A bicycle front derailleur, comprising:
a base member configured to be mounted to a bicycle frame,
a chain guide;
a first link pivotally connected to the chain guide about a first pivot axis; and
a second link pivotally connected to the chain guide about a second pivot axis, wherein
the chain guide includes a link-connecting structure pivotally connected to the first link,
the link-connecting structure includes a first link-connecting portion and a second link-connecting portion,
the first link includes a chain guide-connecting structure pivotally connected to the link-connecting structure of the chain guide,
the chain guide-connecting structure includes a first chain guide-connecting portion and a second chain guide-connecting portion,
at least one of the first link-connecting portion and the second link-connecting portion is located between the first chain guide-connecting portion and the second chain guide-connecting portion,
The first link includes a cable-actuation portion to transmit a pulling force of a bicycle-control cable to the first link, and the first chain guide-connecting portion is located between the cable-actuation portion and the first link-connecting portion as viewed in a transverse direction of the chain guide, which is perpendicular to the first pivot axis.

3. The bicycle front derailleur according to claim 2, wherein the first chain guide-connecting portion partly overlaps with the cable-actuation portion as viewed from the transverse direction.

4. A bicycle front derailleur, comprising:
a base member configured to be mounted to a bicycle frame,
a chain guide;
a first link pivotally connected to the chain guide about a first pivot axis; and
a second link pivotally connected to the chain guide about a second pivot axis, wherein
the chain guide includes a link-connecting structure pivotally connected to the first link,
the link-connecting structure includes a first link-connecting portion and a second link-connecting portion,
the first link includes a chain guide-connecting structure pivotally connected to the link-connecting structure of the chain guide,
the chain guide-connecting structure includes a first chain guide-connecting portion and a second chain guide-connecting portion,
at least one of the first link-connecting portion and the second link-connecting portion is located between the first chain guide-connecting portion and the second chain guide-connecting portion,
the second chain guide-connecting portion is located between the first link-connecting portion and the second link-connecting portion, and
the bicycle front derailleur further comprises a biasing member located between the first link-connecting portion and the second chain guide-connecting portion.

5. The bicycle front derailleur according to claim 4, wherein
the biasing member includes a first end and a second end opposite to the first end in the pivot an axial direction of the first pivot axis,
the first end of the biasing member is located in a vicinity of the first link-connecting portion to transmit a biasing force to the chain guide, and
the second end of the biasing member is located in a vicinity of the second chain guide-connecting portion to transmit a biasing force to the first link.

6. The bicycle front derailleur according to claim 1, wherein
the first link is located closer to the bicycle frame than the second link in a state where the base member is mounted to the bicycle frame,
the chain guide includes a first chain guide plate and a second chain guide plate, and
the first chain guide plate and the second chain guide plate define a chain receiving space therebetween.

7. The bicycle front derailleur according to claim 6, wherein the first link-connecting portion and the second link-connecting portion protrude from the first chain guide plate toward the bicycle frame.

8. The bicycle front derailleur according to claim 7, wherein the first chain guide plate is located closer to the bicycle frame than the second chain guide plate in a state where the base member is mounted to the bicycle frame.

9. The bicycle front derailleur according to claim 1, further comprising a pivot pin coaxially-arranged with the first pivot axis, wherein the pivot pin is configured to be coupled to the first chain guide-connecting portion and the second chain guide-connecting portion in a press-fit manner, respectively.

10. The bicycle front derailleur according to claim 9, wherein the first link-connecting portion and the second link-connecting portion are rotationally coupled to the pivot pin.

11. The bicycle front derailleur according to claim 1, wherein
the chain guide is configured to move between a retracted position and an extended position with respect to the base member, and
the first link is configured such that the first pivot axis moves in a forward-rearward direction when the chain guide moves between the retracted position and the extended position.

12. The bicycle front derailleur according to claim 1, wherein the first link-connecting portion and the first chain guide-connecting portion are located above the second link-connecting portion and the second chain guide-connecting portion in a state where the base member is mounted to the bicycle frame.

13. The bicycle front derailleur according to claim 12, wherein the first link-connecting portion is located between the first chain guide-connecting portion and the second chain guide-connecting portion.

14. The bicycle front derailleur according to claim 2, wherein the cable-actuation portion includes a cable attachment portion to which a bicycle-control cable is fixed.

15. A bicycle front derailleur, comprising:
a base member configured to be mounted to a bicycle frame,
a chain guide configured to move between a retracted position and an extended position with respect to the base member,
an adjustment structure configured to adjust at least one of the retracted position and the extended position, the adjustment structure including:
at least one adjustment member, and
a looseness-suppression member disposed inside the adjustment structure and configured to suppress looseness of the at least one adjustment member, the looseness-suppression member having an outer periphery, the outer periphery having at least one recessed portion configured to receive the at least one adjustment member in a state where the least one recessed portion of the looseness-suppression member receives the at least one adjustment member.

16. The bicycle front derailleur of claim 15, wherein the at least one adjustment member rotates around its own center axis to adjust the at least one of the retracted position and the extended position.

* * * * *